United States Patent
Jang et al.

(10) Patent No.: US 10,800,283 B2
(45) Date of Patent: Oct. 13, 2020

(54) WIRELESS POWER TRANSFER METHOD FOR ELECTRIC VEHICLE BASED ON AUXILIARY BATTERY STATUS AND ELECTRIC VEHICLE FOR THE SAME

(71) Applicants: HYUNDAI MOTOR COMPANY, Seoul (KR); KIA MOTORS CORPORATION, Seoul (KR)

(72) Inventors: Jin Su Jang, Hwaseong-si (KR); Taek Hyun Jung, Hwaseong-si (KR); Jae Yong Seong, Hwaseong-si (KR); Zeung Il Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 331 days.

(21) Appl. No.: 15/637,535

(22) Filed: Jun. 29, 2017

(65) Prior Publication Data

US 2018/0001772 A1 Jan. 4, 2018

(30) Foreign Application Priority Data

Jul. 1, 2016 (KR) .................. 10-2016-0083678
Jun. 16, 2017 (KR) .................. 10-2017-0076882

(51) Int. Cl.
*B60L 53/12* (2019.01)
*B60L 58/12* (2019.01)
(Continued)

(52) U.S. Cl.
CPC ............ *B60L 58/12* (2019.02); *B60L 1/00* (2013.01); *B60L 11/182* (2013.01); *B60L 53/12* (2019.02); *B60L 53/126* (2019.02); *B60L 53/20* (2019.02); *B60L 53/22* (2019.02); *B60L 53/305* (2019.02); *B60L 58/18* (2019.02); *B60L 58/20* (2019.02); *H02J 7/007* (2013.01); *B60L 2210/10* (2013.01); *B60L 2250/16* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
CPC ...... B60L 11/182; B60L 53/12; B60L 53/122; B60L 53/126; G06Q 10/20
USPC .................................................. 320/108, 109
See application file for complete search history.

(56) References Cited

U.S. PATENT DOCUMENTS 9,346,365 B1 * 5/2016 Penilla ............... G06Q 30/0265
2011/0254377 A1 * 10/2011 Wildmer ............... B60L 11/182
307/104

(Continued)

*Primary Examiner* — Jerry D Robbins
(74) *Attorney, Agent, or Firm* — Morgan, Lewis & Bockius LLP

(57) ABSTRACT

A wireless power transfer (WPT) method based on a state of an auxiliary battery and an electric vehicle (EV) for the same includes receiving, by an EV charging apparatus, a wireless jump start request message from a user terminal; transmitting, by the EV charging apparatus, a primary jump start power according to the wireless jump start request message to the EV; driving an auxiliary power supply device provided in the EV by a secondary jump start power induced by the primary jump start power; driving a controller of the EV based on a preset power outputted from the auxiliary power supply device; and charging, by the controller of the EV, an auxiliary battery of the EV.

12 Claims, 6 Drawing Sheets

(51) Int. Cl.
*B60L 1/00* (2006.01)
*B60L 53/30* (2019.01)
*B60L 53/20* (2019.01)
*B60L 58/18* (2019.01)
*B60L 58/20* (2019.01)
*B60L 53/22* (2019.01)
*B60L 53/126* (2019.01)
*B60L 11/18* (2006.01)
*H02J 7/00* (2006.01)

(56) References Cited

U.S. PATENT DOCUMENTS

| | | | |
|---|---|---|---|
| 2013/0200846 A1* | 8/2013 | Ang | B60L 50/51 |
| | | | 320/109 |
| 2014/0012448 A1* | 1/2014 | Tripathi | G05D 1/0276 |
| | | | 701/22 |
| 2014/0203777 A1* | 7/2014 | Flack | B60L 3/04 |
| | | | 320/109 |

\* cited by examiner

WIRELESS POWER TRANSFER METHOD FOR ELECTRIC VEHICLE BASED ON AUXILIARY BATTERY STATUS AND ELECTRIC VEHICLE FOR THE SAME

CROSS-REFERENCE TO RELATED APPLICATION

This application is based on and claims the benefit of priority to Korean Patent Application No. 2016-0083678 filed on Jul. 1, 2016, and Korean Patent Application No. 2017-0076882 filed on Jun. 16, 2017 with the Korean Intellectual Property Office (KIPO), the disclosure of which is hereby incorporated in its entirety by reference.

TECHNICAL FIELD

The present disclosure relates to a wireless power transfer (WPT) method and an electric vehicle for the same, and more particularly, to a WPT method and an electric vehicle in which an auxiliary battery is first charged in a case that the auxiliary battery is discharged, and then a high-voltage battery of an electric vehicle is charged under an appropriate auxiliary battery state.

BACKGROUND

Countries around the world have researched and developed electric vehicles. The electric vehicles are eco-friendly because they do not generate carbon monoxide (CO) and/or carbon dioxide ($CO_2$), which are the main causes of air pollution and global warming, unlike conventional transportation methods using fossil fuels.

In particular, electric vehicles are expected to contribute to leveling of power loads and maximization of use of renewable energy in conjunction with a smart grid that aims to optimize energy efficiency.

In order to disseminate and utilize electric vehicles, researches on charging methods of the electric vehicles have been continuously carried out. One of the charging methods is a method of a wireless power transfer using an electromagnetic induction phenomenon.

In wireless charging of an electric vehicle, power is supplied from a power grid to a charging station, and further supplied to an induction coil (e.g., transmission coil) connected to the charging station so that an electromotive force is generated in a reception coil mounted on the electric vehicle. Then, a battery of the electric vehicle is usually supplied with power by the generated electromotive force.

However, conventional electric vehicles use an auxiliary battery for driving an electric vehicle control system in addition to a high-voltage battery used as a main power supply. In this case, if the auxiliary battery is fully discharged, the control system is disabled and the wireless charging cannot be performed. For this reason, there has been a problem of manually starting the control system by using a jumper cable.

Therefore, even if the auxiliary battery is fully discharged, there is a need to operate the control system more conveniently and perform wireless charging without manual operation.

SUMMARY

Accordingly, embodiments of the present disclosure are provided to substantially obviate one or more problems due to the above limitations and disadvantages of the related art.

Embodiments of the present disclosure provide a wireless power transfer method capable of wirelessly charging an electric vehicle by considering a state of an auxiliary battery supplying power to a charging controller in the electric vehicle even in a case that the auxiliary battery is discharged.

Embodiments of the present disclosure also provide an electric vehicle performing a wireless power transfer method capable of wirelessly charging an electric vehicle by considering a state of an auxiliary battery supplying power to a charging controller in the electric vehicle even in a case that the auxiliary battery is discharged.

According to embodiments of the present disclosure, a wireless power transfer (WPT) method based on a state of an auxiliary battery, performed in a WPT system for an electric vehicle (EV), may be provided. The WPT method may comprise receiving, by an EV charging apparatus, a wireless jump start request message from a user terminal; transmitting, by the EV charging apparatus, a primary jump start power according to the wireless jump start request message to the EV; driving an auxiliary power supply device provided in the EV by a secondary jump start power induced by the primary jump start power; driving a controller of the EV based on a preset power outputted from the auxiliary power supply device; and charging, by the controller of the EV, an auxiliary battery of the EV.

The WPT method may further comprise transmitting, by the controller of the EV, a wireless charging request message requesting to charge a high-voltage battery of the EV to the EV charging apparatus; and transmitting, by the EV charging apparatus, a wireless charging power according to the wireless charging request message to the EV.

The EV may receive power from the EV charging apparatus through coupling between a ground assembly (GA) coil of the EV charging apparatus and a vehicle assembly (VA) coil of the EV, and the auxiliary power supply device may be connected in parallel with the VA coil.

The auxiliary power supply device may be a switched mode power supply (SMPS) supplying a direct current (DC) power of 12 volts to the controller of the EV.

In the charging of the auxiliary battery of the EV, the controller of the EV may turn off the auxiliary power supply device, and charge the auxiliary battery with the high-voltage battery supplying power to a power train system of the EV. Here, the controller of the EV may convert power of the high-voltage battery to a low-voltage direct current (DC) power by using a low voltage DC-DC converter connected in parallel with the high-voltage battery, and charge the auxiliary battery by using the converted low-voltage DC power.

The wireless charging request message may include information on a maximum direct current (DC) power and allowed voltage and current of the EV.

The receiving a wireless jump start request message may further comprise performing, by the EV charging apparatus, authentication of the user terminal; and exchanging, by the EV charging apparatus, status information with the user terminal.

The performing authentication may comprise authenticating, by the EV charging apparatus, the EV through the user terminal.

The EV may transmit status information on the EV including whether or not the auxiliary battery is discharged through the user terminal and a telematics equipment.

Furthermore, in accordance with embodiments of the present disclosure, an electric vehicle (EV) may comprise a vehicle assembly (VA) coil for generating a secondary power by receiving a primary power from an EV charging apparatus; a high-voltage battery that is charged by using the secondary power generated in the VA coil and supplies power to a power train system of the EV; a communication module for controlling wireless charging of the EV by communicating with the EV charging apparatus; a controller for controlling the communication module and charging the high-voltage battery by using the secondary power generated in the VA coil; an auxiliary battery for supplying power to the controller; and an auxiliary power supply device that is driven by the secondary jump start power and supplies power to the controller, when a primary jump start power is received from the EV charging apparatus and the secondary jump start power is generated from the primary jump start power at the VA coil.

When the controller is driven by the power supplied by the auxiliary power supply device, the controller may control charging of the auxiliary battery, and charge the high-voltage battery by using the secondary power generated in the VA coil by requesting the primary power to the EV charging apparatus after the charging of the auxiliary battery is completed.

The auxiliary power supply device may be connected in parallel with the VA coil.

The auxiliary power supply device may be a switched mode power supply (SMPS) supplying a direct current (DC) power of 12 volts to the controller of the EV.

The controller of the EV may turn off the auxiliary power supply device, and charge the auxiliary battery with the high-voltage battery supplying power to a power train system of the EV. Here, the controller of the EV may convert power of the high-voltage battery to a low-voltage direct current (DC) power by using a low voltage DC-DC converter connected in parallel with the high-voltage battery, and charge the auxiliary battery by using the converted low-voltage DC power.

The communication module may transmit a wireless charging control message, including information on a maximum direct current (DC) power and allowed voltage and current of the EV, to the EV charging apparatus.

The communication module may transmit status information on the EV including whether or not the auxiliary battery is discharged through the user terminal and a telematics equipment.

Furthermore, in accordance with embodiments of the present disclosure, a wireless charging method based on a state of an auxiliary battery for an electric vehicle (EV) having an auxiliary power supply device may comprise driving the auxiliary power supply device by a secondary jump start power generated by receiving a primary jump start power from an EV charging apparatus; driving a controller of the EV by a preset power outputted from the auxiliary power supply device; charging, by the controller of the EV, an auxiliary battery; transmitting, by the controller of the EV, a wireless charging request message requesting to charge a high-voltage battery of the EV to the EV charging apparatus; and transmitting, by the EV charging apparatus, a wireless charging power according to the wireless charging request message to the EV.

The auxiliary power supply device may be a switched mode power supply (SMPS) for supplying a direct current (DC) power of 12 volts to the controller of the EV.

Using the above-described method based on a state of an auxiliary battery according to the present disclosure, an electric vehicle may be conveniently charged and operated even when the auxiliary battery is fully discharged. Also, since a jumper cable is not necessary even when the auxiliary battery is discharged, there is an advantage that the driver can conveniently and safely initiate and perform charging of the EV.

BRIEF DESCRIPTION OF DRAWINGS

Embodiments of the present disclosure will become more apparent by describing in detail embodiments of the present disclosure with reference to the accompanying drawings, in which.

Figure 1:
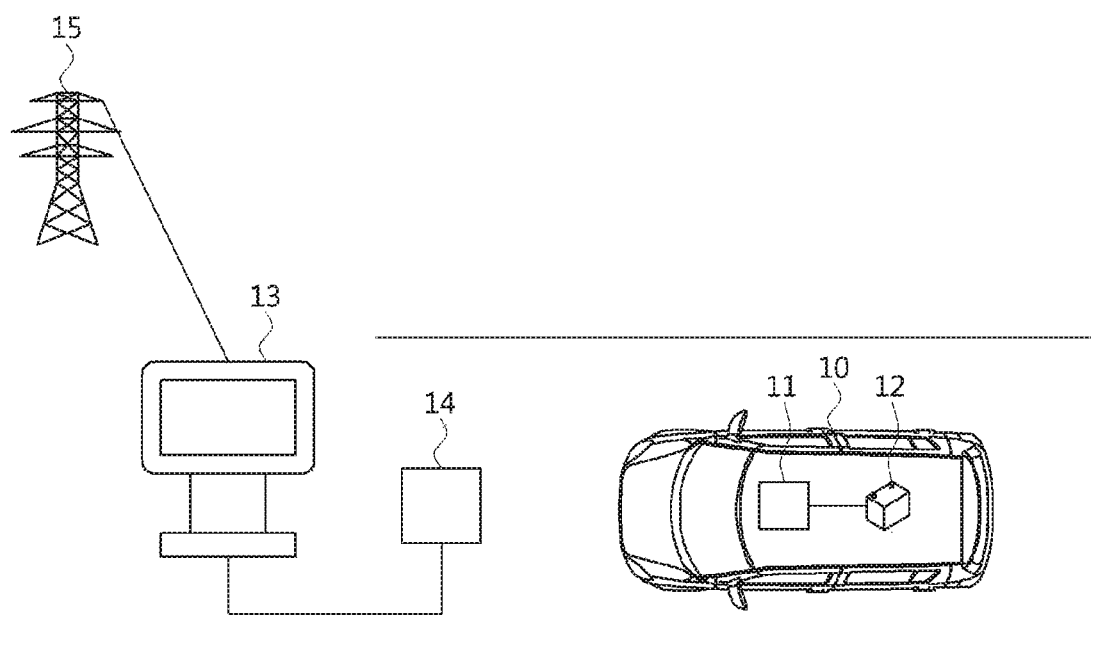
FIG. 1 is a conceptual diagram illustrating a concept of a wireless power transfer (WPT) to which an embodiment of the present disclosure is applied.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": A system for a wireless power transfer and control between the GA and VA including alignment and communications. This system transfers energy from the electric supply network to the electric vehicle electromagnetically through a two-part loosely coupled transformer.

"Wireless power transfer, WPT": A transfer of electrical power from an AC supply network to an electric vehicle by contactless means.

"Utility": A set of systems which supply electrical energy and include a customer information system (CIS), an advanced metering infrastructure (AMI), rates and revenue system, etc. The utility may provide an EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which component of a system interwork with corresponding components of the system in order to perform operations aimed by the system. Also, information interoperability may mean capability that two or more networks, systems, devices, applications, or components can efficiently share and easily use information without giving inconvenience to users.

"Inductive charging system": A system transferring energy from a power source to an EV through a two-part gapped core transformer in which the two halves of the transformer, primary and secondary coils are physically separated from one another. In the present disclosure, the inductive charging system may correspond to an EV power transfer system.

"Inductive coupler": A transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly, GA'": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly, VA": An assembly on the vehicle consisting of the VA Coil, rectifier/power conversion unit and VA controller as well as the wiring to the vehicle batteries and between each unit, filtering circuits, housing (s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": A portion of the GA that regulates the output power level to the GA Coil based on information from the vehicle.

"VA controller": A portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": A vertical distance between the plane of the higher of the top of the litz wire or the top of the magnetic material in the GA Coil to the plane of the lower of the bottom of the litz wire or the magnetic material in the VA Coil when aligned.

"Ambient temperature": A ground-level temperature of the air measured at the subsystem under consideration and not in direct sun light.

"Vehicle ground clearance": A vertical distance between the ground surface and the lowest part of the vehicle floor pan.

"Vehicle magnetic ground clearance": A vertical distance between the plane of the lower of the bottom of the litz wire or the magnetic material in the VA Coil mounted on a vehicle to the ground surface.

"VA Coil magnetic surface distance": A distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. The pairing may include the process by which a VA controller and GA controller of a charging spot are correlated. The correlation/association process may include the process of an establishment of a relationship between two peer communication entities.

"Command and control communication": A communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning ad pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID basically distinguishes multiple wireless LANs. Therefore, all access points (Aps) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is A name of the network to which you want to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller managing the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, the light load driving or light load operation may include, for example, charging the high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

FIG. 1 is a conceptual diagram illustrating a concept of a wireless power transfer (WPT) to which an embodiment of the present disclosure is applied.

Referring to FIG. 1, a wireless power transfer may be performed by at least one component of an electric vehicle (EV) 10 and a charging station 13, and may be used for wirelessly transferring power to the EV 10.

Here, the EV 10 may be usually defined as a vehicle supplying an electric power stored in a rechargeable energy storage such as a battery 12 as an energy source of an electric motor which is a power train system of the EV 10.

However, the EV 10 according to the present disclosure may include a hybrid electric vehicle (HEV) having an electric motor and an internal combustion engine together, and may include not only an automobile but also a motorcycle, a cart, a scooter, and an electric bicycle. Also, the EV 10 may include a power reception pad 11 including a reception coil for charging the battery 12 wirelessly and may include a plug connection for conductively charging the battery 12. Here, the EV 10 capable of conductively charging the battery may be referred to as a plug-in electric vehicle (PEV).

Here, the charging station 13 may be connected to a power grid 15 or a power backbone, and may provide an alternating current (AC) power or a direct current (DC) power to a power transmission pad 14 including a transmission coil through a power link.

Also, the charging station 13 may communicate with an infrastructure management system or an infrastructure server that manages the power grid 15 or a power network through wired/wireless communications, and performs wireless communications with the EV 10.

Here, the wireless communications may be Bluetooth, Zigbee, cellular, wireless local area network (WLAN), or the like.

Also, for example, the charging station 13 may be located at various places such as a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 14 of the charging station 13, and making the reception coil and the transmission coil be interacted or coupled with each other. An electromotive force may be induced in the power reception pad 11 as a result of the interaction or coupling, and the battery 12 may be charged by the induced electromotive force.

The charging station 13 and the transmission pad 14 may be referred to as a ground assembly (GA) in whole or in part, where the GA may refer to the previously defined meaning.

All or part of internal components and the reception pad 11 of the EV 10 may be referred to as a vehicle assembly (VA), in which the VA may refer to the previously defined meaning.

Here, the power transmission pad 14 or the power reception pad 11 may be configured to be non-polarized or polarized.

In a case that a pad is non-polarized, there is one pole in a center of the pad and an opposite pole in an outer periphery. Here, a flux may be formed to exit from the center of the pad and return at all to outer boundaries of the pad.

In a case that a pad is polarized, it may have a respective pole at either end of the pad. Here, a magnetic flux may be formed based on an orientation of the pad.

Figure 2:
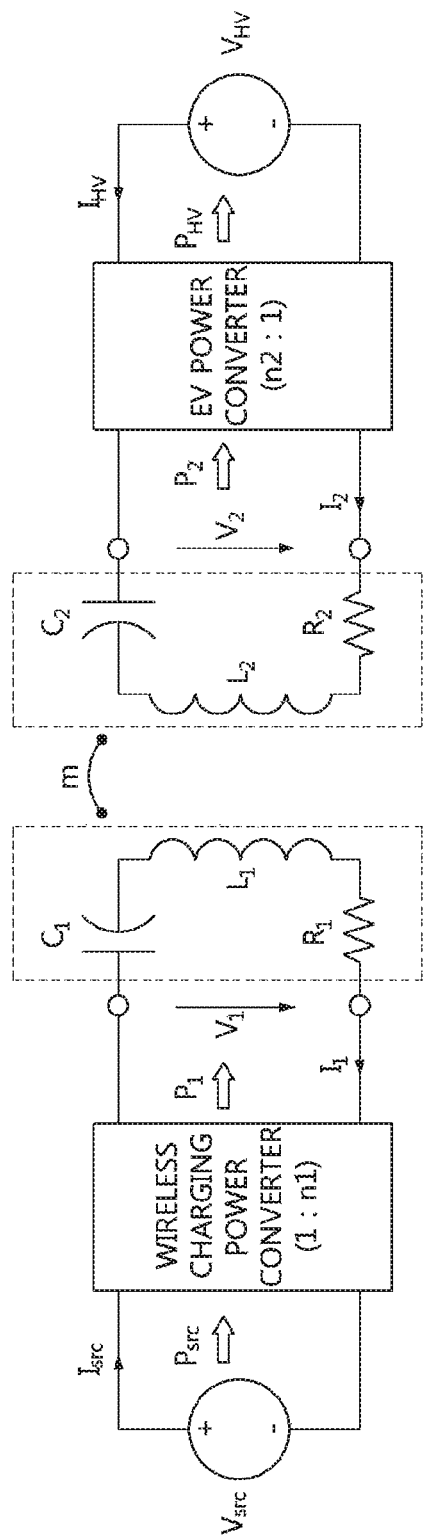
FIG. 2 is a conceptual diagram illustrating a wireless power transfer circuit according to an embodiment of the present disclosure.

FIG. 2 is a conceptual diagram illustrating a wireless power transfer circuit according to an embodiment of the present disclosure.

Referring to FIG. 2, a schematic configuration of a circuit in which a wireless power transfer is performed in an EV WPT system may be seen.

Here, the left side of FIG. 2 may be interpreted as expressing all or part of a power source $V_{src}$ supplied from the power network, the charging station 13, and the transmission pad 14 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a wireless charging power converter. The wireless charging power converter may supply an output power $P_1$ converted from the output power $P_{src}$ through frequency-converting and AC-to-DC converting so as to generate an electromagnetic field at a desired operating frequency in a transmission coil $L_1$.

Specifically, the wireless charging power converter may include an AC/DC converter for converting the power $P_{src}$ which is an AC power supplied from the power network into a DC power, and a low frequency (LF) converter for converting the DC power into a DC power having an operating frequency suitable for wireless charging. For example, the operating frequency for wireless charging may be determined to be within 80 to 90 kHz.

The power $P_1$ output from the wireless charging power converter may be supplied again to a circuit composed of the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to an EV power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The EV power converter may include an LF/DC converter that converts the supplied power $P_2$ of a specific operating frequency to a DC power having a voltage level suitable for the battery $V_{HV}$ of the EV.

The electric power $P_{HV}$ converted from the power $P_2$ supplied to the EV power converter may be output, and the power $P_{HV}$ may be used for charging the battery $V_{HV}$ installed in the EV.

Here, the right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

Here, the circuit of FIG. 2 should be understood as an illustrative circuit for wireless power transfer in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

Here, the transmission coil $L_1$ may be included in the transmission pad 14 in FIG. 1, and the reception coil $L_2$ may be included in the reception pad 11 in FIG. 1. Therefore, positioning between the transmission pad and the reception pad or positioning between the EV and the transmission pad will be described below with reference to the drawings.

Figure 3:
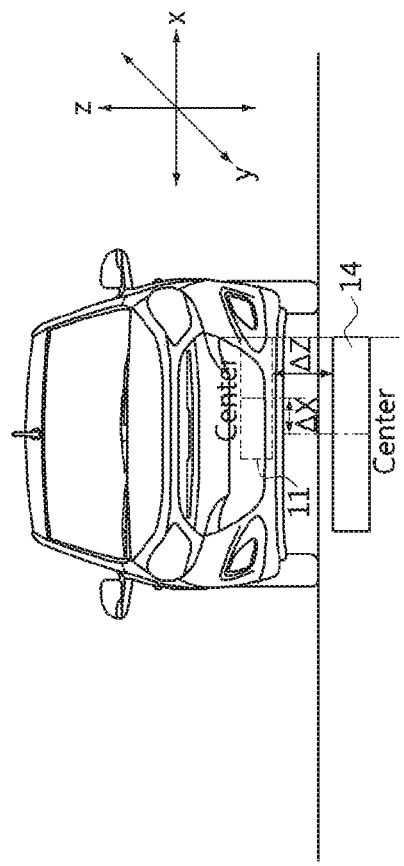
FIG. 3 is a conceptual diagram for explaining a concept of alignment in an EV wireless power transfer according to an embodiment of the present disclosure.

FIG. 3 is a conceptual diagram for explaining a concept of alignment in an EV wireless power transfer according to an embodiment of the present disclosure.

Referring to FIG. 3, a method of aligning the power transmission pad 14 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 14 is illustrated as positioned below a ground surface as shown in FIG. 3, the transmission pad 14 may also be positioned on the ground surface, or positioned such that a top surface of the transmission pad 14 is exposed below the ground surface.

The reception pad 11 of the EV may be defined by different categories according to its heights (defined in the z direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

Here, the height of the reception pad measured from the ground surface may correspond to the previously defined term 'vehicle magnetic ground clearance'.

Further, the position of the power transmission pad 14 in the height direction (i.e., defined in the z direction) may be determined to be located between the maximum class and the minimum class supported by the power reception pad 11. For example, when the reception pad supports only the class 1 and 2, the position of the power transmission pad 14 may be determined between 100 and 210 mm with respect to the power reception pad 11.

Still further, a gap between the center of the power transmission pad 14 and the center of the power reception pad 11 may be determined so as to be located within the limits of the horizontal and vertical directions (defined in the x and y directions). For example, it may be determined to be located within ±75 mm in the horizontal direction (defined in the x direction), and within ±100 mm in the vertical direction (defined in the y direction).

Here, the relative positions of the power transmission pad 14 and the power reception pad 11 may be varied in accordance with their experimental results, and the numerical values should be understood as exemplary.

Figure 4:
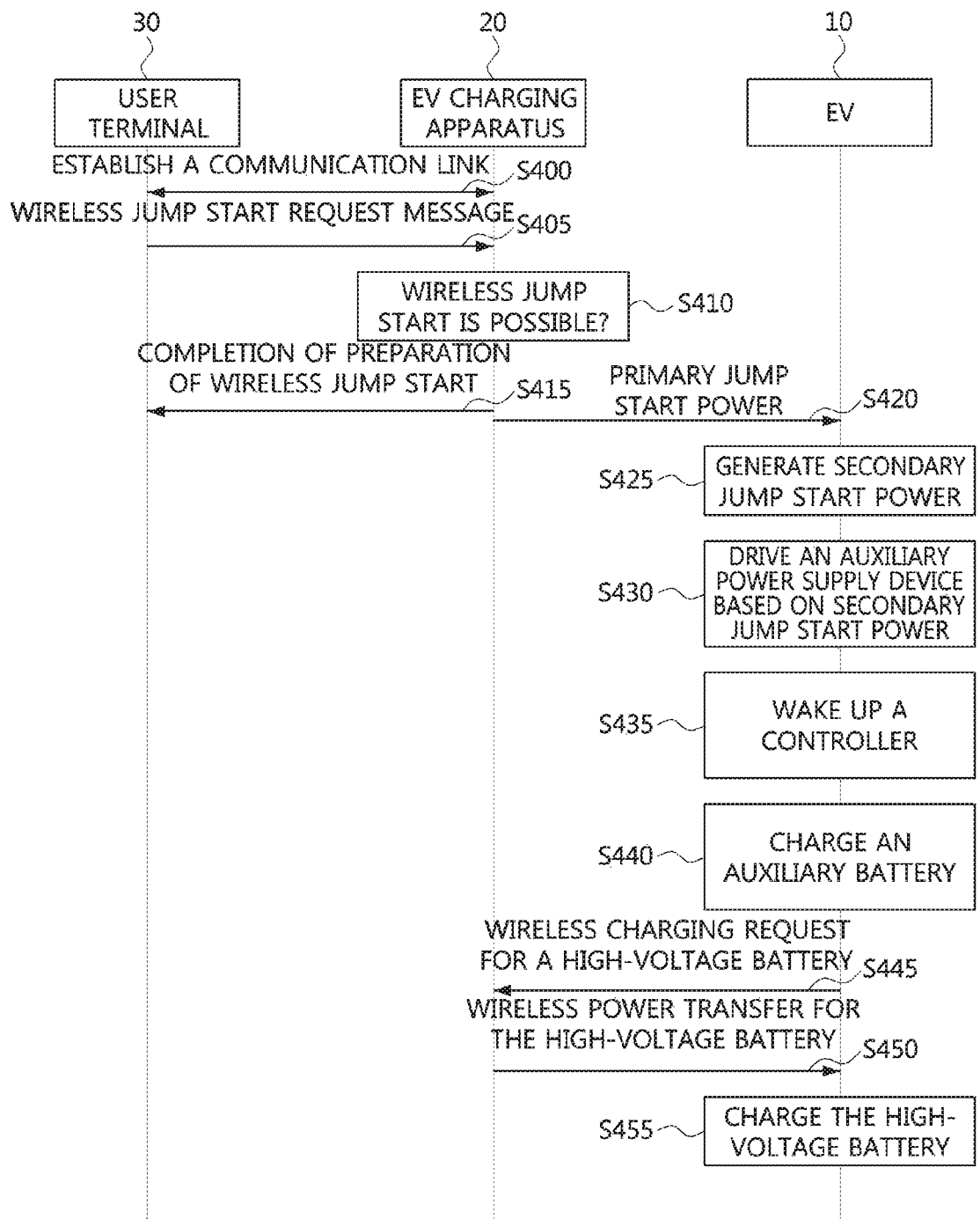
FIG. 4 is a sequence diagram for explaining a WPT method based on an auxiliary battery state according to an embodiment of the present disclosure.

FIG. 4 is a sequence diagram for explaining a WPT method based on an auxiliary battery state according to an embodiment of the present disclosure.

Referring to FIG. 4, when a driver (or, user) of the EV 10 recognizes that an auxiliary battery of the EV is discharged, a user terminal 30 owned by the driver (or, user) of the EV 10 and a EV charging apparatus 20 which will be described later may establish a mutual communication link (S400). The step S400 of establishing the mutual communication link may include a step of connecting the user terminal to the EV charging apparatus 20 to perform a user authentication and a step in which state information of the user terminal 30 and the EV charging apparatus 20 are exchanged. Here, the user authentication may include not only authentication of the user of the user terminal (or, the driver of the EV 10) but also authentication of the EV 10 operated by the user.

The user terminal 30 may be one of various devices capable of communicating with the EV charging apparatus 20, such as a desktop computer, a laptop computer, a smart phone, a tablet PC, a mobile phone, a smart watch, a smart glass, an e-book reader, a portable multimedia player (PMP), a portable game player, a navigation device, a digital camera, a digital multimedia broadcasting (DMB) player, a digital audio recorder, a digital audio player, a digital video recorder, a digital video player, a Personal Digital Assistant (PDA), and the like.

The step of establishing the mutual communication link may correspond to the pairing or association defined above, or may be understood as a corresponding meaning.

Once the mutual communication link between the user terminal 30 and the EV charging apparatus 20 has been established, the user terminal 30 may transmit a wireless jump start request message to the EV charging apparatus 20 (S405). The EV charging apparatus 20 may check whether power for the requested wireless jump start is available or not or whether the requested wireless jump start is possible or not (S410), and may transmit a message indicating completion of preparation of the wireless jump start to the user terminal 30 if the wireless jumping start is possible (S415).

Before the wireless jump start request message is transmitted (S405), the EV 10 may be aligned to a permissible position where the power reception pad of the EV is able to receive the power for the wireless jump start from the EV charging apparatus 20. Here, the permissible position may be a position that satisfies the condition explained referring to FIG. 3.

Then, a primary jump start power may be transmitted to the EV 10 that has been verified or confirmed in the mutual communication link establishment step S400 (S420).

The primary jump start power may generate or induce a secondary jump start power in the EV 10 by electromagnetic induction (S425). Then, an auxiliary power supply device, which will be described later, mounted in the EV 10 may be driven by the secondary jump start power (S430). Then, the auxiliary power supply device driven by the secondary jump start power may wake up a controller of the EV 10 (S435). The controller of the EV 10 may perform charging of the auxiliary battery (S440). When charging of the auxiliary battery is completed, the EV 10 may transmit a wireless charging request message requesting wireless charging of the high-voltage battery to the EV charging apparatus 20 (S445). The EV charging apparatus 20 may transfer wireless power for charging the high-voltage battery to the EV 10 (S450), and the EV 10 may charge the high-voltage battery with the electric power generated by using the transferred wireless power (S455). Further, the EV charging apparatus 20 may transmit information on a charged state of the high-voltage battery to the user terminal 30.

Here, the EV charging apparatus 20 may refer to all or part of the charging station 13 and the transmission pad 14 according to FIG. 1. For example, a device that communicates with the EV 10 or controls the transmission pad 14 at the charging station 13 or the charging station 13 may be referred to as a Supply Equipment Communication Controller (SECC), and a device controlling the output power of the transmission coil as included in the transmission pad 14 or the charging station 13 may be referred to as a Primary Device Communication Controller (PDCC). Also, the EV charging station may be defined as the SECC or the PDCC or as including the SECC and/or the PDCC. Based on the above-described definition, operations of the EV charging apparatus 20 may be described specifically as below.

First, the steps S400 to S420 may be described in detail as follows.

An establishment of the mutual communication link between the user terminal 30 and the EV charging apparatus 20 may include establishing a communication link between the user terminal 30 and the SECC. When the communication link is established, the user terminal 30 may transmit a message (i.e., a wireless jump start request message) requesting a wireless jump start to the SECC, and the SECC may confirm whether transfer of power for the wireless jump start is possible or not, and transmit a message indicating that preparation of the transfer of the power for the wireless jump start is completed to the user terminal 30. Also, the SECC may request the PDCC to transfer the power for wireless jump start (i.e., the primary jump start power), and thus the PDCC may transfer the primary jump start power to the EV 10.

Next, the steps S445 to S455 will be described in detail. When charging of the auxiliary battery is completed, the EV 10 may transmit a message requesting wireless charging of the high-voltage battery to the SECC, and the SECC may request the PDCC to adjust the output power for the charging of the high-voltage battery.

The PDCC may adjust the voltage and frequency of its output power in response to the adjustment request and transfer the wireless power to the EV 10. When the transmission of the wireless power is initiated or completed, the SECC may inform the user terminal 30 that the wireless charging is initiated or completed. Also, the SECC may transmit information on a progress state of the wireless charging to the user terminal 30 while transmitting the wireless power.

Figure 5:
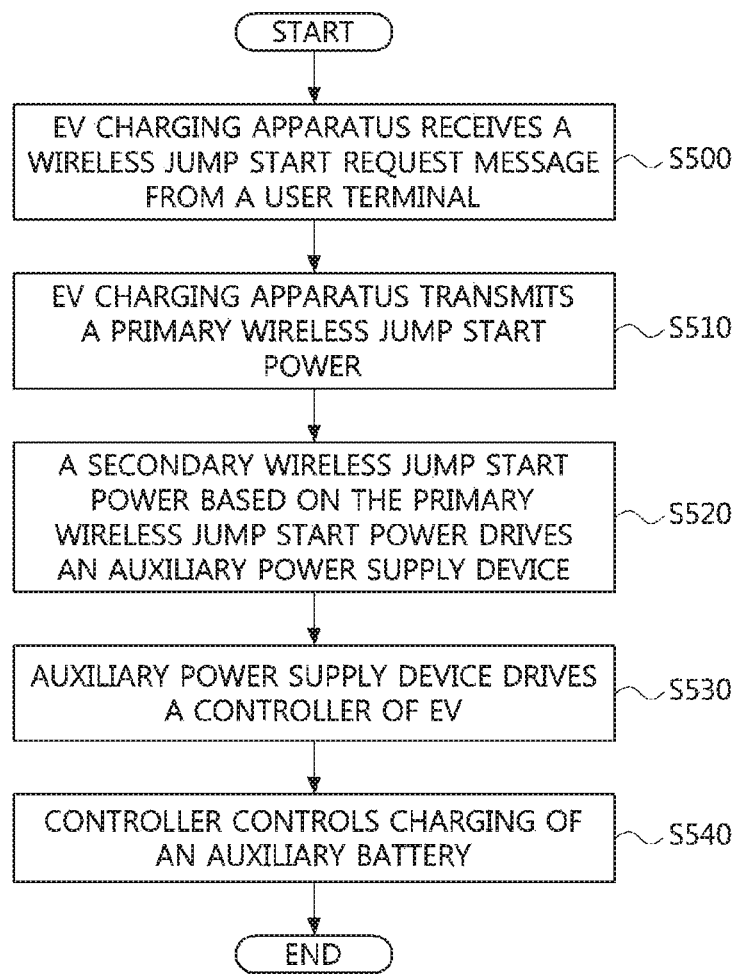
FIG. 5 is a flow chart for explaining a WPT method based on an auxiliary battery state according to an embodiment of the present disclosure.

FIG. 5 is a flow chart for explaining a WPT method based on an auxiliary battery state according to an embodiment of the present disclosure.

Referring to FIG. 5, a WPT method according to an embodiment of the present disclosure may comprise a step S500 in which the EV charging apparatus 20 receives a wireless jump start request message from a user terminal; a step S510 in which the EV charging apparatus transmits a primary jump start power according to the wireless jump start request message to the EV; a step S520 in which an auxiliary power supply device provided in the EV is driven by a secondary jump start power induced by the primary jump start power received at the EV; a step S530 in which the auxiliary power supply device outputs a preset power to drive the controller of the EV; and a step S540 in which the auxiliary battery is charged under a control of the controller of the EV.

The WPT method may further comprise a step in which the controller of the EV transmits a wireless charging request message to the EV charging apparatus when the charging of the auxiliary battery is completed; a step in which the EV charging apparatus transfers a wireless power for charging the high-voltage battery to the EV according to the wireless charging request message; and a step in which the controller of the EV controls the charging of the high-voltage battery by using the transferred power.

Further, the EV may receive the power from the EV charging apparatus by electromagnetic coupling between the GA coil of the EV charging apparatus and the VA coil of the EV. The auxiliary power supply device may be connected in parallel with the VA coil.

Here, the primary jump start power may be set so that the power according to the rated voltage of the auxiliary power supply device is supplied by the secondary jump start power induced from the primary jump start power. Accordingly, the primary jump start power may be set differently according to the type of the auxiliary power supply device.

The wireless charging request message may include information on the maximum DC power and allowed voltage and current of the EV.

Further, the wireless charging power may have a predetermined value for charging the high-voltage battery of the EV, and may be different from the primary jump start power, but may be the same.

The auxiliary power supply device may be a switched mode power supply (SMPS) that supplies 12 V (volts) of DC power to the controller of the EV.

In the step S540 of charging the auxiliary battery by the controller of the EV, the controller of the EV may turn off the auxiliary power supply device and charge the auxiliary battery with the high-voltage battery. That is, the power of the high-voltage battery may be converted into a low-voltage DC power by using a low DC-DC converter (LDC) connected in parallel to the high-voltage battery, and the auxiliary battery may be charged using the converted power.

The wireless jump start request message may include the maximum DC power of the EV and the allowed voltage and current of the EV.

In the step of receiving the wireless jump start request message from the user terminal by the EV charging apparatus, the step of performing the user authentication by the EV charging apparatus with respect to the user terminal and the step of exchanging the status information with the user terminal may be included.

Further, the step of performing the user authentication of the user terminal by the EV charging apparatus may include the step of the EV charging apparatus authenticating the EV through the user terminal.

Here, the EV may transmit EV status information including whether the auxiliary battery is discharged through telematics with the user terminal.

Figure 6:
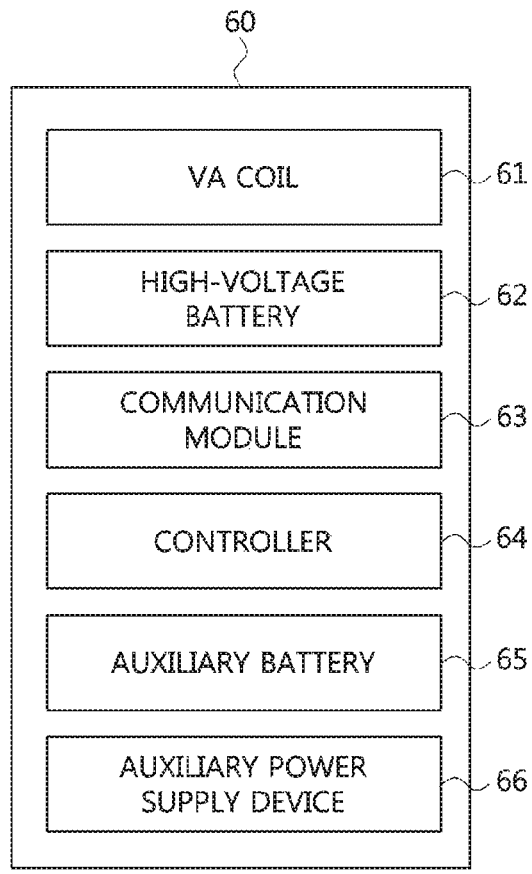
FIG. 6 is a block diagram illustrating a configuration of an EV capable of performing a WPT method according to an embodiment of the present disclosure.

FIG. 6 is a block diagram illustrating a configuration of an EV capable of performing a WPT method according to an embodiment of the present disclosure.

Referring to FIG. 6, an EV 60 according to an embodiment of the present disclosure may include a VA coil 61 receiving a primary electric power transmitted from the EV charging apparatus to generate a secondary electric power; a high-voltage battery 62 that is charged using the secondary power generated by the VA coil 61 and provides the electric power of the EV 60; a communication module 63 for communicating with the EV charging apparatus to transmit and receive a message for controlling wireless charging of the EV 60; a controller 64 for controlling the communication module 63 and charging the high-voltage battery 62 using the electric power generated in the VA coil; an auxiliary battery 65 for supplying power to the controller 64; and an auxiliary power supply device 66 driven by the secondary jump start power to supply power to the controller 64 when a primary jump start power is received from the EV charging apparatus and the secondary jump start power is generated in the VA coil 61.

Further, the controller 64 may control the charging of the auxiliary battery 65 when the power is supplied from the auxiliary power supply device 66, and charge the high-voltage battery 62 with the electric power generated in the VA coil 61 by requesting the wireless charging power from the EV charging apparatus when the charging of the auxiliary battery 65 is completed.

Further, the auxiliary power supply device 66 may be connected in parallel with the VA coil 61.

The auxiliary power supply device 66 may be a SMPS that supplies 12 V of DC power to the controller 64.

Still further, once the controller 64 is driven by the power supplied from the auxiliary power supply device 66, the controller 64 may turn off the auxiliary power supply device 66 and charge the auxiliary battery 65 with the high-voltage battery. Specifically, the controller 64 may convert the power of the high-voltage battery 62 into a low-voltage DC by using a LDC connected in parallel to the high-voltage battery 62, and charge the auxiliary battery 65 by using the converted power.

The communication module 63 may exchange control messages including information on the maximum DC power and allowed voltage and current of the EV with the EV charging apparatus.

The communication module 63 may transmit the EV status information including whether the auxiliary battery is discharged through the user terminal owned by the user of the EV and a telematics equipment.

Figure 7:
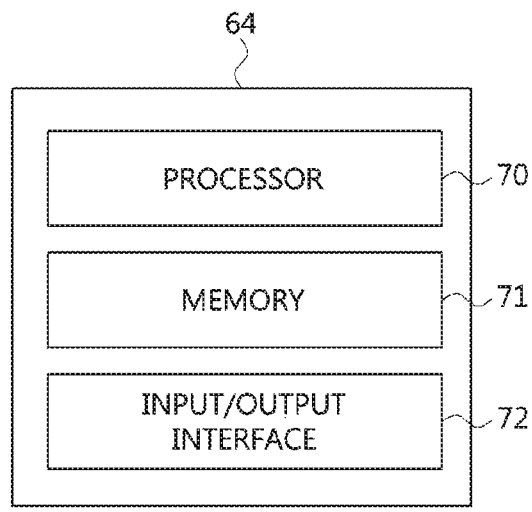
FIG. 7 is a block diagram illustrating a configuration of a controller included in an EV according to an embodiment of the present disclosure.

FIG. 7 is a block diagram illustrating a configuration of a controller included in an EV according to an embodiment of the present disclosure.

Referring to FIG. 7, the controller 64 may comprise at least one processor 70 and a memory 71 for storing instructions configured to cause the at least one processor to perform operating procedures of the controller 64 which were explained referring to FIG. 6.

Here, the controller 64 may further comprise an input/output interface 72 capable of receiving input from the user (or, driver) or displaying control information to the user. For example, the input/output interface 72 may refer to a touch screen, a display device, or the like that receives input from the user.

Here, the controller 64 may be implemented in a vehicle control unit (VCU), or implemented in or as a battery management system (BMS).

Figure 8:
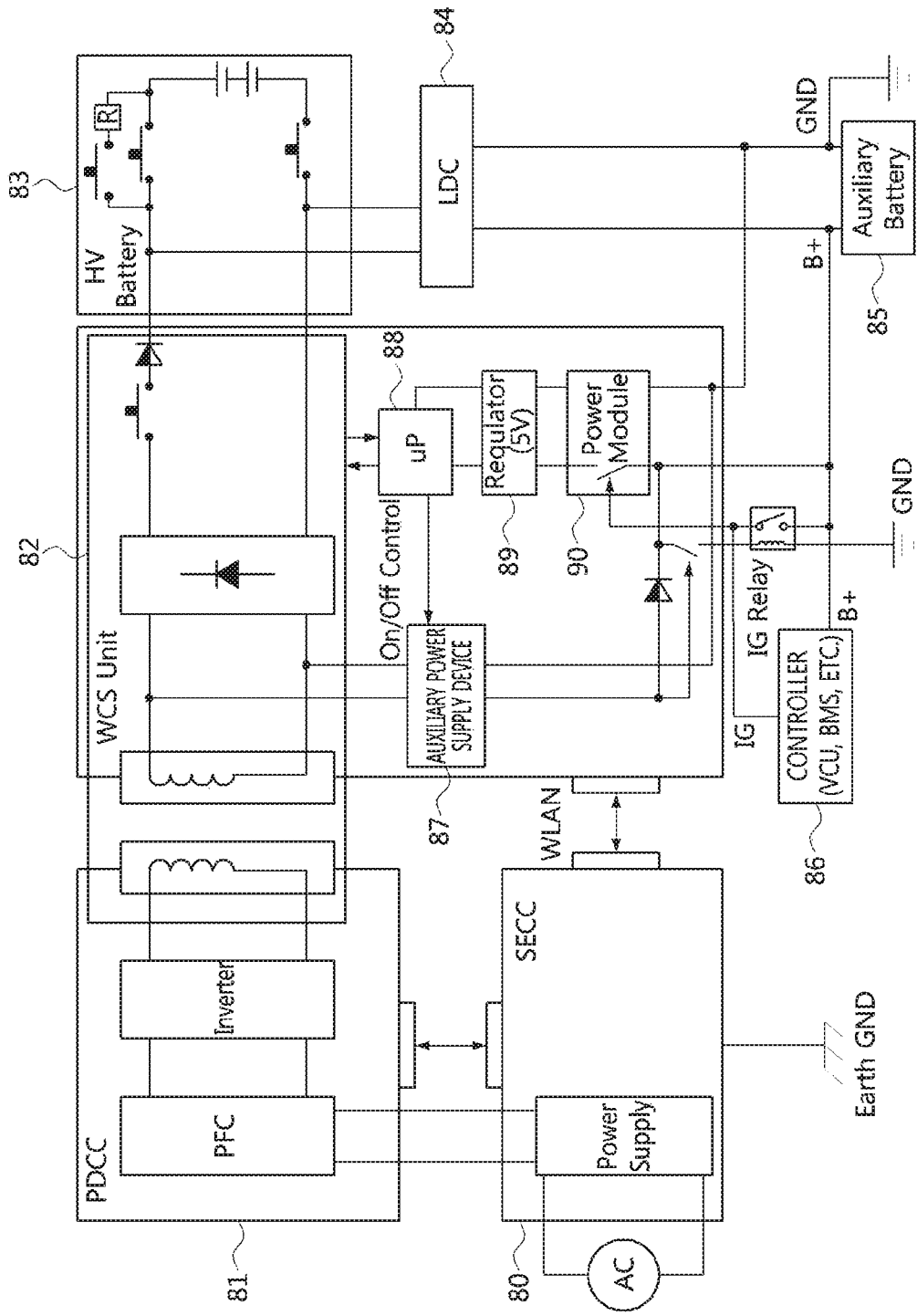
FIG. 8 is a conceptual diagram illustrating a configuration of a WPT system according to an embodiment of the present disclosure.

FIG. 8 is a conceptual diagram illustrating a configuration of a WPT system according to an embodiment of the present disclosure.

Referring to FIG. 8, an SECC 80 may include a power supply receiving power from a power network and transmitting the power to a PDCC 81. The PDCC 81 may comprise a power factor corrector (PFC), an inverter, and a transmission coil. The PFC may reduce power loss by reducing harmonic content in the AC power supplied from the SECC 80, and output a power-factor-corrected AC power. The inverter may adjust the voltage level of the AC power outputted from the PFC to be suitable for charging the high-voltage battery of the EV. Also, the inverter may adjust the voltage level differently depending on whether the electric power to be transmitted to the EV is the primary jump start power or the wireless charging power for charging the high-voltage battery.

The power transmitted from the PDCC 81 may generate an induced electromotive force in the reception coil in a charging circuit 82 of the EV, and the induced electromotive force may be supplied to the high-voltage battery 83 so that the high-voltage battery 83 is charged.

Further, the power of the high-voltage battery may be converted to a low-voltage DC through a LDC 84 connected in parallel with the high-voltage battery 83, and may be supplied to an auxiliary battery 85.

The auxiliary battery 85 may supply power to the controller 86.

The controller 86 may control the charging circuit 82 to charge the high-voltage battery 83, and control the LDC 84 to charge the auxiliary battery 85 using the high-voltage battery 83.

Still further, the auxiliary power supply device 87 may be configured in parallel with the reception coil of the charging circuit 82, and the primary jump start power supplied from the PDCC 81 may drive the auxiliary power supply device 87.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A wireless power transfer (WPT) method based on a state of an auxiliary battery, performed in a WPT system for an electric vehicle (EV) having an auxiliary power supply device, the method comprising:
   driving the auxiliary power supply device by a wireless jump start received from a primary device communication controller (PDCC) controlling output power of a ground assembly (GA) coil of an EV charging apparatus, wherein power transmitted from the PDCC generates an induced electromotive force in a vehicle assembly (VA) coil in a charging circuit of the EV and the induced electromotive force is supplied to a high-voltage battery so that the high-voltage battery is charged;
   driving a controller of the EV by power outputted from the auxiliary power supply device;
   turning off, by the controller, the auxiliary power supply device;
   charging, by the controller, the auxiliary battery of the EV with the high-voltage battery of the EV;
   requesting, by the controller, the EV charging apparatus to charge the high-voltage battery after the charging of the auxiliary battery is completed; and
   receiving a wireless power from the EV charging apparatus,
   wherein the auxiliary power supply device is connected in parallel with the VA coil, and
   wherein the auxiliary power supply device is a switched mode power supply (SMPS) supplying a direct current (DC) power of 12 volts to the controller.

2. The wireless power transfer method according to claim 1, wherein the EV receives the wireless power from the EV charging apparatus through coupling between the GA coil of the EV charging apparatus and the VA coil of the EV.

3. The wireless power transfer method according to claim 1, wherein, in the charging the auxiliary battery, the controller converts power of the high-voltage battery to a low-voltage direct current (DC) power by using a low voltage DC-DC converter connected in parallel with the high-voltage battery, and charges the auxiliary battery by using the converted low-voltage DC power.

4. The wireless power transfer method according to claim 1, wherein the requesting the EV charging apparatus to charge a high-voltage battery includes transmitting a wireless charging request message to the EV charging apparatus.

5. The wireless power transfer method according to claim 4, wherein the wireless charging request message includes information on a maximum direct current (DC) power, an allowed voltage of the EV and a current of the EV.

6. The wireless power transfer method according to claim 1, wherein the EV transmits status information on the EV including whether or not the auxiliary battery is discharged through a user terminal and a telematics equipment.

7. The wireless power transfer method according to claim 1, wherein, after driving the controller of the EV by power outputted from the auxiliary power supply device, turning off the auxiliary power supply device is performed by the controller, and
wherein, after turning off the auxiliary power supply device by the controller, charging the auxiliary battery of the EV with the high-voltage battery of the EV is performed by the controller.

8. An electric vehicle (EV) comprising:
a vehicle assembly (VA) coil for receiving a wireless power from an EV charging apparatus;
a high-voltage battery that is charged by using the wireless power received by the VA coil and supplies power to a powertrain system of the EV;
a communication module for controlling wireless charging of the EV by communicating with the EV charging apparatus;
a controller for controlling the communication module and charging the high-voltage battery by using the wireless power received by the VA coil;
an auxiliary battery for supplying power to the controller; and
an auxiliary power supply device that is driven by a wireless jump start power and supplies power to the controller, when a wireless jump start power is received by the VA coil from a primary device communication controller (PDCC) controlling output power of a ground assembly (GA) coil of the EV charging apparatus, wherein power transmitted from the PDCC generates an induced electromotive force in the VA coil in a charging circuit of the EV and the induced electromotive force is supplied to a high-voltage battery so that the high-voltage battery is charged, wherein, when the controller is driven by power supplied by the auxiliary power supply device, the controller turns off the auxiliary power supply device, charges the auxiliary battery with the high-voltage battery, and requests wireless power from the EV charging apparatus for charging the high-voltage battery after the charging of the auxiliary battery is completed, wherein the auxiliary power supply device is connected in parallel with the VA coil, and wherein the auxiliary power supply device is a switched mode power supply (SMPS) supplying a direct current (DC) power of 12 volts to the controller.

9. The electric vehicle according to claim 8, wherein the controller converts power of the high-voltage battery to a low-voltage direct current (DC) power by using a low voltage DC-DC converter connected in parallel with the high-voltage battery, and charges the auxiliary battery by using the converted low-voltage DC power.

10. The electric vehicle according to claim 8, wherein the communication module transmits a wireless charging control message to the EV charging apparatus, the wireless charging control message including information on a maximum direct current (DC) power, an allowed voltage of the EV and a current of the EV.

11. The electric vehicle according to claim 8, wherein the communication module transmits status information on the EV including whether or not the auxiliary battery is discharged through a user terminal and a telematics equipment.

12. The electric vehicle according to claim 8, wherein, after the controller is driven by power supplied by the auxiliary power supply device, the controller sequentially performs: turning off the auxiliary power supply device, charging the auxiliary battery with the high-voltage battery, and requesting wireless power from the EV charging apparatus for charging the high-voltage battery.

* * * * *